(12) United States Patent
Kou et al.

(10) Patent No.: US 12,233,401 B1
(45) Date of Patent: Feb. 25, 2025

(54) LITHIUM ABSORBENT AND PREPARATION METHOD THEREFOR

(71) Applicant: SUNRESIN NEW MATERIALS CO. LTD., Shaanxi (CN)

(72) Inventors: Xiaokang Kou, Shaanxi (CN); Suidang Li, Shaanxi (CN); Wenjin Gao, Shaanxi (CN); Huan Zhang, Shaanxi (CN); Qiong Liu, Shaanxi (CN)

(73) Assignee: SUNRESIN NEW MATERIALS CO. LTD., Shaanxi (CN)

( * ) Notice: Subject to any disclaimer, the term of this patent is extended or adjusted under 35 U.S.C. 154(b) by 0 days.

(21) Appl. No.: 18/473,474

(22) Filed: Sep. 25, 2023

(30) Foreign Application Priority Data

Aug. 4, 2023 (CN) .......................... 202310980240.1

(51) Int. Cl.
*B01J 20/30* (2006.01)
*B01J 20/02* (2006.01)
*B01J 20/10* (2006.01)
*B01J 20/26* (2006.01)
*B01J 20/28* (2006.01)

(52) U.S. Cl.
CPC ....... *B01J 20/3042* (2013.01); *B01J 20/0248* (2013.01); *B01J 20/103* (2013.01); *B01J 20/262* (2013.01); *B01J 20/2803* (2013.01); *B01J 20/2804* (2013.01); *B01J 20/3007* (2013.01); *B01J 20/3064* (2013.01); *B01J 20/3078* (2013.01)

(58) Field of Classification Search
CPC ...... B01J 20/30; B01J 20/3042; B01J 20/103; B01J 20/262; B01J 20/2803; B01J 20/2804; B01J 20/3007; B01J 20/3064; B01J 20/3078
USPC ........................................................ 502/402
See application file for complete search history.

(56) References Cited

FOREIGN PATENT DOCUMENTS

| | | | | | |
|---|---|---|---|---|---|
| CN | 102631897 A | 8/2012 | | | |
| CN | 108114693 A | 6/2018 | | | |
| CN | 110102273 A | 8/2019 | | | |
| CN | 110215896 A | 9/2019 | | | |
| CN | 110961070 A | 4/2020 | | | |
| CN | 111036169 A | 4/2020 | | | |
| CN | 108043358 B | 7/2020 | | | |
| CN | 115155528 A | 10/2022 | | | |
| CN | 115845825 A | 3/2023 | | | |
| EP | 4134159 A1 | 2/2023 | | | |
| KR | 2021074782 A | * | 6/2021 | ............. | B01J 20/08 |
| RU | 2722839 C2 | 6/2020 | | | |
| WO | WO-2023276697 A1 | * | 1/2023 | ............. | B01J 20/06 |
| WO | 2023124974 A1 | 7/2023 | | | |

OTHER PUBLICATIONS

International Search Report Application No. PCT/CN2023/113140 dated Dec. 1, 2023, 2 pages.
Written Opinion of the International Searching Authority Application No. PCT/CN2023/113140 dated Dec. 1, 2023, 5 pages.
First Office Action of corresponding Russia application 2023129939/05 dated Apr. 16, 2024.
First Office Action of corresponding China application 202310980240.1 dated May 27, 2024.
Office Action of Corresponding Canadian Application No. 3,216,007 Dated Nov. 6, 2024, 3 pages.
Second Office Action of Corresponding Chinese Application No. 2023109802401 dated Jan. 9, 2025, 16 pages.

* cited by examiner

*Primary Examiner* — Edward M Johnson
(74) *Attorney, Agent, or Firm* — DINSMORE & SHOHL LLP

(57) ABSTRACT

Provided are a lithium adsorbent and a preparation method therefor. A raw material for preparing the lithium adsorbent includes a lithium adsorbent active material and an auxiliary material, where the auxiliary material includes a hydrophilic binder and reinforcing fibers, and the use of the reinforcing fibers and the hydrophilic binder strongly prevents the propagation of brittle cracks caused by volume expansion and contraction of the lithium adsorbent active material during use, significantly increasing the strength and cycle life of the lithium adsorbent, while the use of the hydrophilic binder increases the adsorption rate and capacity of the lithium adsorbent.

19 Claims, No Drawings

LITHIUM ABSORBENT AND PREPARATION METHOD THEREFOR

This application claims priority to Chinese Application 202310980240.1 filed Aug. 4, 2023, the contents of which are incorporated herein by reference.

TECHNICAL FIELD

The present disclosure relates to the field of lithium extraction by adsorption, and in particular to a lithium adsorbent and a preparation method therefor.

BACKGROUND

Lithium, as the lightest metal element in the periodic table of elements, is widely used in the fields of aviation and navigation, new energy materials, ceramics, lithium batteries, nuclear industry, etc. due to its unique physicochemical properties. In particular, the explosion of the new energy automobile industry in recent years, which brings a super-large cycle to the market of lithium resources, is also an important reason for industry-wide competition for lithium mines today. Lithium resources in China are mainly found in solid lithium ores and salt lake brines. A method for extracting lithium from a salt lake mainly includes an adsorption method, a precipitation method, a solvent extraction method, a calcination method, a membrane separation method, etc., among which the adsorption method is considered as an economical and efficient method for extracting lithium from the salt lake brine due to the advantages of low cost, high selectivity, stable cycle and no pollution. Currently lithium adsorbents are mostly in a powder form, have a high dissolution rate during preparation and regeneration, and are not suitable for widespread use.

For this purpose, a patent CN115845825A provides a lithium adsorbent molding method. Polyvinyl chloride, polyurethane TPU and chlorinated polyvinyl chloride which are used as a binder, and polyvinylpyrrolidone, polyethylene glycol 8000 and polyethylene glycol 400 which are used as a pore-forming agent are mixed with a lithium adsorbent in a specific ratio, and the mixture is extruded, solidified, washed and dried to achieve granulation molding of a powdered lithium adsorbent. However, the lithium adsorbent prepared by this method has the problems of a slow adsorption rate and low adsorption capacity.

SUMMARY OF THE INVENTION

Therefore, the technical problem to be solved by the present disclosure is to overcome the defects of a slow adsorption rate and low adsorption capacity of a lithium adsorbent existing in the prior art, thereby providing a novel lithium adsorbent and a preparation method therefor.

The present disclosure provides a lithium adsorbent, and a raw material for preparing the lithium adsorbent includes a lithium adsorbent active material, a hydrophilic binder and reinforcing fibers.

The term lithium adsorbent active material refers to an adsorbent having an adsorbing function on lithium ions, and adsorbents conventional in the art may be employed, such as an aluminum salt lithium adsorbent.

Further, the hydrophilic binder includes at least one of an inorganic binder and an organic binder.

Further, the inorganic binder is any one or a combination of two or more selected from silica sol, alumina sol, potassium silicate, lithium silicate, sodium silicate, and polyaluminum chloride: preferably the silica sol; and the organic binder is a hydrophilic macromolecular polymer or an aqueous solution containing a hydrophilic macromolecular polymer, wherein the hydrophilic macromolecular polymer includes any one or a combination of two or more of urea-formaldehyde resin and polyvinyl alcohol, preferably the urea-formaldehyde resin.

Further, a mass percentage of a dry matter in the hydrophilic binder is 5-30% based on a dry weight of the lithium adsorbent active material being 100%.

Further, the reinforcing fibers are selected from any one or a combination of two or more of glass fibers, polyacrylonitrile fibers, polypropylene fibers, polyethylene fibers, polyvinyl chloride fibers, polyamide fibers, and polyester fibers:
preferably, the reinforcing fibers have a diameter ranging from 1 μm to 50 μm and a length ranging from 10 μm to 10 mm; and
more preferably, the reinforcing fibers have a diameter ranging from 1 μm to 12 μm and a length ranging from 0.1 mm to 2 mm.

Further, a mass of the reinforcing fibers is 1-20% of the dry weight of the lithium adsorbent active material, preferably 1-5% of the dry weight of the lithium adsorbent active material.

Further, the lithium adsorbent active material is an aluminum salt lithium adsorbent, preferably dry powder or wet powder having a water content of less than 60% of an aluminum salt lithium adsorbent.

Further, the lithium adsorbent active material is prepared from lithium hydroxide and alumina sol by gelling, aging and heating in the presence of water.

Further, a mass ratio of the lithium hydroxide to the alumina sol is (2-10): 100; and/or, sealed heating is performed at a temperature of 80-180° C.; and/or, the heating is performed for 2-24 h.

Further, the raw material for preparing the lithium adsorbent further includes other adjuvants, wherein preferably the other adjuvants are selected from one or a combination of more of a pore-forming agent, a thickener, and a pH regulator.

Further, the pore-forming agent is one or a combination of more selected from butylene glycol, glycerol, and sodium chloride; and/or, the thickener is one or a combination of more selected from guar gum, *sesbania* powder, starch, and glucose; and/or, the pH regulator is one or a combination of more selected from calcium carbonate, sodium bicarbonate, ammonium chloride, calcium hydroxide, sodium carbonate, and aqueous ammonia; and/or, a mass of the pore-forming agent is 10-100% of the dry weight of the lithium adsorbent active material; and/or, a mass of the thickener is 0.1-2% of the dry weight of the lithium adsorbent active material; and/or, a mass of the pH regulator is 1-20% of the dry weight of the lithium adsorbent active material.

Further, the raw material for preparing the lithium adsorbent consists of an aluminum salt lithium adsorbent, silica sol, guar gum and glass fibers, wherein based on a dry weight of the aluminum salt lithium adsorbent being 100%, a mass percentage of a dry matter in the silica sol is 9%, a mass percentage of the guar gum is 1%, and a mass percentage of the glass fibers is 2%; or,
the raw material for preparing the lithium adsorbent consists of an aluminum salt lithium adsorbent, silica sol, ammonium chloride, calcium carbonate and glass fibers, wherein based on a dry weight of the aluminum salt lithium adsorbent being 100%, a mass percentage of a dry matter in the silica sol is 9%, a mass percentage of ammonium chloride is 10%, a mass percentage of calcium carbonate is 6%, and a mass percentage of the glass fibers is 3%; or, the raw material for preparing the lithium adsorbent consists of an aluminum salt lithium adsorbent, silica sol, calcium carbonate, sodium bicarbonate and glass fibers, wherein based on a dry weight of the aluminum salt lithium adsorbent being 100%, a mass percentage of a dry matter in the silica sol is 6%, a mass percentage of calcium carbonate is 6%, a mass percentage of sodium bicarbonate is 2%, and a mass percentage of the glass fibers is 4%.

The present disclosure further provides a method for preparing any one lithium adsorbent described above, including the following steps of mixing the raw material for preparing the lithium adsorbent, and performing extruding, curing and drying to prepare the lithium adsorbent.

Further, the curing is performed at a temperature ranging from room temperature to 80° C.

Further, the drying is performed at a temperature ranging from 80° C. to 150° C., preferably ranging from 80° C. to 120° C.

Optionally, the curing time ranges from 12 h to 36 h and the drying time ranges from 2 h to 10 h.

Further, the prepared lithium adsorbent is in the form of a strip, and preferably, the strip has a width ranging from 0.1 mm to 2 mm and a length ranging from 1 mm to 10 mm.

The technical solution of the present disclosure has the following advantages:

1. According to the lithium adsorbent provided by the present disclosure, the raw material for preparing the lithium adsorbent includes the lithium adsorbent active material, the hydrophilic binder and the reinforcing fibers, the use of the reinforcing fibers and the hydrophilic binder strongly prevents the propagation of brittle cracks caused by volume expansion and contraction of the lithium adsorbent active material during use by being bonded to microscopic particles of the lithium adsorbent active material through hydrogen bonds or ionic bonds and by the anchoring effect of the reinforcing fibers, the strength and cycle life of the lithium adsorbent are significantly increased, and the use of the hydrophilic binder significantly increases the adsorption rate and capacity of the lithium adsorbent.
2. According to the lithium adsorbent provided by the present disclosure, the inorganic binder is any one or a combination of two or more selected from silica sol, alumina sol, potassium silicate, lithium silicate, sodium silicate, and polyaluminium chloride (especially silica sol), the reinforcing fibers are selected from any one or a combination of two or more of glass fibers, polyacrylonitrile fibers, polypropylene fibers, polyethylene fibers, polyvinyl chloride fibers, polyamide fibers, and polyester fibers (especially glass fibers), the aluminum salt lithium adsorbent is prepared from lithium hydroxide and alumina sol by gelling, aging and heating in the presence of water, and by optimizing the method for preparing the aluminum salt lithium adsorbent, and the types and usage amounts of the hydrophilic binder and the reinforcing fibers, the adsorption rate and capacity can be better improved.
3. The method for preparing the lithium adsorbent provided by the present disclosure is low in preparation cost and simple in process, does not use an organic solvent in the whole process, is environmentally friendly and pollution-free, is suitable for large-scale production, and has broad application prospects in extracting lithium from salt lakes.
4. According to the method for preparing the lithium adsorbent provided by the present disclosure, the drying temperature is controlled to range from 80° C. to 150° C., and when the drying temperature is lower than 80° C., the prepared lithium adsorbent has too high crystal water content, the mechanical strength is reduced and the apparent adsorption capacity is low; when the drying temperature is higher than 150° C., $LiCl \cdot 2Al(OH)_3$ in an aluminum-based lithium adsorbent starts to dehydrate and decompose into LiCl and $\gamma$-$Al_2O_3$, and lithium ions cannot be adsorbed again, resulting in a decrease in the adsorption capacity of the lithium adsorbent. The drying temperature in the present disclosure preferably ranges from 80° C. to 120° C., and the lithium adsorbent obtained at this temperature can better improve the adsorption rate and capacity.

DETAILED DESCRIPTION

The following examples are provided for a better further understanding of the present disclosure, are not limited to the best embodiments, and do not limit the content and scope of protection of the present disclosure. Any product identical to or similar to the present disclosure obtained by anyone under the inspiration of the present disclosure or by combining the present disclosure with other features in the prior art falls within the scope of protection of the present disclosure.

Specific experimental steps or conditions are not specified in the examples, they can be performed according to the operations or conditions of conventional experimental steps described in the literature in the field. The used reagents or instruments of which a manufacturer is not indicated are conventional commercially available reagent products.

The polyacrylonitrile fibers are manufactured by a manufacturer: Shandong Oude Chemical Fiber Products Co., Ltd., and have a model of PD650. The polyethylene fibers are manufactured by a manufacturer: Shandong New Power Engineering Materials Co., Ltd., and are customized to have a diameter of 10 μm and a length of 2 mm. The polyvinyl alcohol is manufactured by a manufacturer: Guangzhou Suixin Chemical Co., Ltd., has a model of 0588 and 2499. The urea-formaldehyde resin is manufactured by a manufacturer: Leixiang Chemical Firm in Erqi District, Zhengzhou City, and has a model of 681, and a solid content of 50%. The silica sol is manufactured by a manufacturer: Guangzhou Suize Environmental Protection Technology Co., Ltd., its specification is neutral silica sol, and the silica sol has a particle size of 10-30 nm, and a solid content of 30%. The glass fibers are manufactured by a manufacturer: Wuhe County Weijia Composite Materials Co., Ltd., and have a model of WJ03, a diameter of 12 μm, and a length of 2 mm. The glass fibers are manufactured by a manufacturer: Taishan Glass Fiber Co., Ltd., and have a model of T435N, having a diameter of 10 μm, and a length of 2 mm; and have a model of T435TM, having a diameter of 8 μm, and a length of 2 mm. The *sesbania* powder is manufactured by a manufacturer: Shandong Taihecheng Bioengineering Co., Ltd., and its specification is food-grade.

The aluminum salt lithium adsorbents in the Examples and Comparative examples of the present disclosure are prepared by the following method:

(1) 8 g of lithium hydroxide is dissolved in 100 g of water to obtain an aqueous lithium hydroxide solution.

(2) 100 g of alumina sol (having an aluminum content of 12.5% by mass, and a mass ratio of aluminum to chlorine being 1.1) is added into the aqueous lithium hydroxide solution prepared in the step (1) to be rapidly mixed until a uniform gel is formed, and the uniform gel is aged overnight.

(3) The gel is loaded into an enamel autoclave, and reacted at 150° C. with closed heating for 12 hours. The reaction product is taken out after cooling. The reaction product is distilled until the water content meets the requirements (30-60%), i.e., wet powder of aluminum salt lithium adsorbents used in the examples. The wet powder is vacuum-dried at 50° C., and pulverized to obtain dry powder of the aluminum salt lithium adsorbent.

Example 1

This example provides a lithium adsorbent, and a raw material for preparing the lithium adsorbent is shown in the table below.

| Raw material | Aluminum salt lithium adsorbent | Hydrophilic binder | Pore-forming agent | Reinforcing agent |
|---|---|---|---|---|
| | Wet powder with a water content of 50% | Urea-formaldehyde resin | Glycerol | Polyacrylonitrile fiber (having a diameter of 10 μm, and a length of 2 mm) |
| Usage amount/g | 100 | 10 | 5 | 1 |

A method for preparing the above lithium adsorbent includes: weighing raw materials according to the usage amounts in the above table, adding the weighed raw materials into a mixing kettle, and uniformly stirring the raw materials at normal temperature to obtain a cemented premix: transferring the premix to a storage tank, and removing bubbles: extruding the premix through a die of a twin screw extruder to extrude filaments onto a conveyor belt to be collected to obtain a filamentous material; storing for curing the filamentous material at room temperature for 24 h, then cutting the cured filamentous material through a cutter, and drying the cut material at 100° C. for 2 h to finally obtain a lithium adsorbent having a diameter of 0.6 mm and a length of 2 mm.

Example 2

This example provides a lithium adsorbent, and a raw material for preparing the lithium adsorbent is shown in the table below.

| Raw material | Aluminum salt lithium adsorbent | Hydrophilic binder | Reinforcing agent |
|---|---|---|---|
| | Wet powder with a water content of 50% | Urea-formaldehyde resin | Polyacrylonitrile fiber (having a diameter of 10 μm, and a length of 2 mm) |
| Usage amount/g | 100 | 15 | 1 |

A method for preparing the above lithium adsorbent includes: weighing raw materials according to the usage amounts in the above table, adding the weighed raw materials into a mixing kettle, and uniformly stirring the raw materials at normal temperature to obtain a cemented premix; transferring the premix to a storage tank, and removing bubbles; extruding the premix through a die of a twin screw extruder to extrude filaments onto a conveyor belt to be collected to obtain a filamentous material; storing for curing the filamentous material at 80° C. for 24 h, then cutting the cured filamentous material through a cutter, and drying the cut material at 120° C. for 2 h to finally obtain a lithium adsorbent having a diameter of 0.6 mm and a length of 2 mm.

Example 3

This example provides a lithium adsorbent, and a raw material for preparing the lithium adsorbent is shown in the table below.

| Raw material | Aluminum salt lithium adsorbent | Hydrophilic binder | Pore-forming agent | Reinforcing agent |
|---|---|---|---|---|
| | Wet powder with a water content of 50% | Urea-formaldehyde resin | Sodium chloride | Glass fiber (having a diameter of 12 μm, and a length of 2 mm) |
| Usage amount/g | 100 | 20 | 25 | 1 |

A method for preparing the above lithium adsorbent is basically the same as that in Example 2 except that the drying time is adjusted to 4 h.

Example 4

This example provides a lithium adsorbent, and a raw material for preparing the lithium adsorbent is shown in the table below.

| Raw material | Aluminum salt lithium adsorbent | Hydrophilic binder | Pore-forming agent | Reinforcing agent |
|---|---|---|---|---|
| | Wet powder with a water content of 50% | Urea-formaldehyde resin | Sodium chloride | Glass fiber (having a diameter of 8 μm, and a length of 2 mm) |
| Usage amount/g | 100 | 10 | 5 | 1 |

A method for preparing the above lithium adsorbent is the same as that in Example 2.

Example 5

This example provides a lithium adsorbent, and a raw material for preparing the lithium adsorbent is shown in the table below.

| Raw material | Aluminum salt lithium adsorbent | Hydrophilic binder | Pore-forming agent | Reinforcing agent |
|---|---|---|---|---|
| | Wet powder with a water content of 50% | Aqueous solution of polyvinyl alcohol 0588 having a mass content of 50% | Glycerol | Glass fiber (having a diameter of 8 μm, and a length of 2 mm) |
| Usage amount/g | 100 | 20 | 5 | 1 |

A method for preparing the above lithium adsorbent is the same as that in Example 1.

Example 6

This example provides a lithium adsorbent, and a raw material for preparing the lithium adsorbent is shown in the table below.

| Raw material | Aluminum salt lithium adsorbent | Hydrophilic binder | Inorganic binder | Reinforcing agent |
|---|---|---|---|---|
| | Wet powder with a water content of 50% | Urea-formaldehyde resin | Silica sol | Glass fiber (having a diameter of 8 μm, and a length of 2 mm) |
| Usage amount/g | 100 | 10 | 15 | 1 |

A method for preparing the above lithium adsorbent is basically the same as that in Example 1 except that the drying temperature is adjusted to 90° C. and the drying time is 6 h.

Example 7

This example provides a lithium adsorbent, and a raw material for preparing the lithium adsorbent is shown in the table below.

| Raw material | Aluminum salt lithium adsorbent | Hydrophilic binder | Thickener | Reinforcing agent |
|---|---|---|---|---|
| | Wet powder with a water content of 50% | Silica sol | Guar gum | Glass fiber (having a diameter of 8 μm, and a length of 2 mm) |
| Usage amount/g | 100 | 15 | 0.5 | 1 |

A method for preparing the above lithium adsorbent is basically the same as that in Example 1 except that the drying temperature is adjusted to 90° C. and the drying time is 2 h.

Example 8

This example provides a lithium adsorbent, and a raw material for preparing the lithium adsorbent is shown in the table below.

| Raw material | Aluminum salt lithium adsorbent | Hydrophilic binder | Thickener | Reinforcing agent |
|---|---|---|---|---|
| | Wet powder with a water content of 50% | Silica sol | Sesbania powder | Glass fiber (having a diameter of 8 μm, and a length of 2 mm) |
| Usage amount/g | 100 | 20 | 0.5 | 2 |

A method for preparing the above lithium adsorbent is the same as that in Example 2.

Example 9

This example provides a lithium adsorbent, and a raw material for preparing the lithium adsorbent is shown in the table below.

| Raw material | Aluminum salt lithium adsorbent | Hydrophilic binder | pH regulator | | Reinforcing agent |
|---|---|---|---|---|---|
| | Wet powder with a water content of 50% | Silica sol | Ammonium chloride | Calcium carbonate | Glass fiber (having a diameter of 8 μm, and a length of 2 mm) |
| Usage amount/g | 100 | 15 | 5 | 3 | 1.5 |

A method for preparing the above lithium adsorbent is the same as that in Example 2.

Example 10

This example provides a lithium adsorbent, and a raw material for preparing the lithium adsorbent is shown in the table below.

| Raw material | Aluminum salt lithium adsorbent | Hydrophilic binder | pH regulator | Reinforcing agent |
|---|---|---|---|---|
| | Wet powder with a water content of 50% | Silica sol | Sodium carbonate | Polyethylene fiber (having a diameter of 10 μm, and a length of 2 mm) |
| Usage amount/g | 100 | 15 | 8 | 1.5 |

A method for preparing the above lithium adsorbent is the same as that in Example 1.

Example 11

This example provides a lithium adsorbent, and a raw material for preparing the lithium adsorbent is shown in the table below.

| Raw material | Aluminum salt lithium adsorbent Wet powder with a water content of 50% | Hydrophilic binder Silica sol | pH regulator Calcium carbonate | Reinforcing agent Glass fiber (having a diameter of 8 μm, and a length of 2 mm) |
|---|---|---|---|---|
| Usage amount/g | 100 | 10 | 4 | 2 |

A method for preparing the above lithium adsorbent is the same as that in Example 2.

Example 12

This example provides a lithium adsorbent, and a raw material for preparing the lithium adsorbent is shown in the table below.

| Raw material | Aluminum salt lithium adsorbent Wet powder with a water content of 50% | Hydrophilic binder Silica sol | pH regulator | | Reinforcing agent |
|---|---|---|---|---|---|
| | | | Calcium carbonate | Sodium bicarbonate | Glass fiber (having a diameter of 8 μm, and a length of 2 mm) |
| Usage amount/g | 100 | 10 | 3 | 1 | 2 |

A method for preparing the above lithium adsorbent is the same as that in Example 2.

Example 13

This example provides a lithium adsorbent, and a raw material and a method for preparing the lithium adsorbent are substantially the same as those in Example 2 except that the drying temperature is adjusted to 70° C. and the drying time is 5 h.

Example 14

This example provides a lithium adsorbent, and a raw material and a method for preparing the lithium adsorbent are substantially the same as those in Example 2 except that the drying temperature is adjusted to 150° C. and the drying time is 2 h.

Comparative Example 1

Lithium adsorbent composite particles are prepared by using the steps of a method in Example 1 of a patent CN108722372A.

Comparative Example 2

This Comparative example provides a lithium adsorbent, and a raw material for preparing the lithium adsorbent is shown in the table below.

| Raw material | Aluminum salt lithium adsorbent Wet powder with a water content of 50% | Hydrophilic binder Silica sol | pH regulator | |
|---|---|---|---|---|
| | | | Calcium carbonate | Sodium bicarbonate |
| Usage amount/g | 100 | 10 | 3 | 1 |

A method for preparing the above lithium adsorbent is the same as that in Example 2.

Comparative Example 3

This Comparative example provides a lithium adsorbent, and a raw material for preparing the lithium adsorbent is shown in the table below.

| Raw material | Aluminum salt lithium adsorbent Wet powder with a water content of 50% | Hydrophilic binder Urea-formaldehyde resin |
|---|---|---|
| Usage amount/g | 100 | 15 |

A method for preparing the above lithium adsorbent is the same as that in Example 2.

Experimental Example 1 Adsorption Performance Test

The adsorption performance of the lithium adsorbents prepared in the Examples and Comparative Example 1 was tested by using a salt lake brine, including adsorption capacities at 2 h and 12 h. Its specific surface area and pore volume were tested with a Geminni V2380 specific surface area and porosity analyzer.

An adsorption performance test method was a static adsorption method. 20 g of deionized water and 2 g of the lithium adsorbent were mixed, the mixture was placed in a shaker for desorption at room temperature at 150 rpm for 15 min, centrifuging was performed to remove free water, deionized water was added again for desorption again, and the above operations were repeatedly performed for 5 times to obtain a lithium deintercalation treated lithium adsorbent, the lithium deintercalation treated lithium adsorbent was added to 200 ml of salt lake brine (with a lithium content of 300 ppm, a magnesium content of 110 g/L, a chlorine content of 300 g/L, and a pH of 5.5), adsorption was performed in a shaker at room temperature at 150 rpm for 2 h, sampling was performed, and re-sampling was performed after an interval of 12 h. A sample to be tested was filtered and the lithium content of the filtrate was tested.

The adsorption capacity of an adsorbent is:

$$Q = V(C_0 - C)/m$$

wherein Q is an adsorption capacity, in $mg \cdot g^{-1}$; V is a volume of an adsorption solution, in L; m is a mass of the adsorbent, in g; and $C_0$ and C are concentrations of lithium ions in brine before and after adsorption, respectively, in $mg \cdot L^{-1}$.

The test results are shown below:

TABLE 1

| Group | Adsorption capacity (mg/g)-2 h | Adsorption capacity (mg/g)-12 h | Specific surface area m²/g | Pore volume cm³/g |
|---|---|---|---|---|
| Example 1 | 6.81 | 9.70 | 80.79 | 0.31 |
| Example 2 | 8.43 | 10.75 | 96.34 | 0.38 |
| Example 3 | 7.89 | 10.78 | 100.14 | 0.36 |
| Example 4 | 7.59 | 9.99 | 102.56 | 0.32 |
| Example 5 | 9.89 | 9.10 | 110.20 | 0.35 |
| Example 6 | 8.98 | 11.05 | 114.58 | 0.38 |
| Example 7 | 10.22 | 12.39 | 120.95 | 0.40 |
| Example 8 | 9.25 | 10.14 | 102.45 | 0.35 |
| Example 9 | 11.21 | 12.16 | 110.21 | 0.37 |
| Example 10 | 9.89 | 10.70 | 105.68 | 0.36 |
| Example 11 | 9.20 | 11.89 | 114.70 | 0.38 |
| Example 12 | 12.33 | 12.92 | 125.15 | 0.40 |
| Example 13 | 9.20 | 10.89 | 114.70 | 0.38 |
| Example 14 | 6.59 | 9.58 | 82.56 | 0.23 |
| Comparative example 1 | 5.02 | 8.65 | 23.25 | 0.36 |

As can be seen from the above results, compared with Comparative example 1, the lithium adsorbent products provided in the examples of the present disclosure are almost in a saturated adsorption state when adsorption is performed for 2h, and have a higher adsorption capacity and adsorption rate. Compared with the other examples, Examples 7, 9 and 12 of the present disclosure have significantly improved adsorption capacity when adsorption is performed for 2h, especially Example 12.

Experimental Example 2

The stability of the lithium adsorbents prepared in the Examples and Comparative examples 2-3 was tested by using a shaker experiment and a periodic adsorption and desorption experiment on a chromatographic column.

The specific operation of the shaker experiment was as follows: 2 g of a lithium adsorbent and 100 ml of water were charged in a 250 ml ground triangular flask, and the ground triangular flask was placed in a shaker, and shaken continuously at 160 rpm for 24 h, and lithium adsorbent fracture was observed.

The specific operation of the periodic adsorption and desorption experiment on the chromatographic column was as follows: 30 g of a lithium adsorbent was soaked in 300 ml of pure water for half an hour. 30 ml of the lithium adsorbent in a lower layer was measured, and loaded into a 50 ml chromatographic column, and a peristaltic pump was used to control a flow rate to pump 300 ml of brine in Experimental example 1 in the chromatographic column in a forward direction for 1 hour (an adsorption step), and then pump 300 ml of pure water for 1 hour (a desorption step), so that one adsorption and desorption cycle was completed, and the adsorption step and the desorption step were repeatedly and alternately performed to 20 cycles.

The results showed that the lithium adsorbents prepared in the Examples of the present disclosure did not exhibit fracture and powder dropping phenomena within 24 hours during the shaker experiment, and no fracture and powder dropping phenomena were found after 20 cycles of adsorption and desorption, and the cycle life is 20 cycles or more, satisfying the practical requirements.

The lithium adsorbents prepared in Comparative examples 2 and 3 showed partial fracture during the shaker experiment after being soaked in water for 2 min and 5 min, respectively. 90% or more of the lithium adsorbents were fractured after being used for a first adsorption and desorption cycle, affecting the use, and the service life is less than one cycle.

Obviously, the above examples are merely instances for clarity of illustration and are not intended to limit the embodiments. Other variations or changes in different forms may be made on the basis of the above description for those of ordinary skill in the art. There is no need and cannot be an exhaustive list of all embodiments here. The obvious variations or changes derived therefrom are still within the scope of protection of the present disclosure.

The invention claimed is:

1. A lithium adsorbent, wherein a raw material for preparing the lithium adsorbent comprises a lithium adsorbent active material and an auxiliary material, wherein the auxiliary material comprises a hydrophilic binder and reinforcing fibers;
wherein the hydrophilic binder comprises at least one of an inorganic binder and an organic binder;
wherein the inorganic binder is selected from the group consisting of silica sol, alumina sol, potassium silicate, lithium silicate, sodium silicate, and polyaluminum chloride; and
the organic binder is a hydrophilic macromolecular polymer or an aqueous solution containing a hydrophilic macromolecular polymer, wherein the hydrophilic macromolecular polymer selected from the group consisting of urea-formaldehyde resin, phenolic resin, melamine resin, and polyvinyl alcohol;
wherein a mass percentage of a dry matter in the hydrophilic binder is 5-30% based on a dry weight of the lithium adsorbent active material being 100%.

2. The lithium adsorbent of claim 1, wherein the inorganic binder is silica sol.

3. The lithium adsorbent of claim 1, wherein the hydrophilic macromolecular polymer is urea-formaldehyde resin.

4. The lithium adsorbent of claim 1, wherein the reinforcing fibers are selected from the group consisting of glass fibers, polyacrylonitrile fibers, polypropylene fibers, polyethylene fibers, polyvinyl chloride fibers, polyamide fibers, and polyester fibers.

5. The lithium adsorbent of claim 1, wherein the reinforcing fibers have a diameter ranging from 1 μm to 50 μm and a length ranging from 10 μm to 10 mm.

6. The lithium adsorbent of claim 5, wherein the reinforcing fibers have a diameter ranging from 1 μm to 12 μm and a length ranging from 0.1 mm to 2 mm.

7. The lithium adsorbent of claim 1, wherein a mass of the reinforcing fibers is 1-20% of the dry weight of the lithium adsorbent active material.

8. The lithium adsorbent of claim 7, wherein a mass of the reinforcing fibers is 1-5% of the dry weight of the lithium adsorbent active material.

9. The lithium adsorbent of claim 1, wherein the lithium adsorbent active material is an aluminium salt lithium adsorbent.

10. The lithium adsorbent of claim 9, wherein the lithium adsorbent active material is dry powder or wet powder having a water content of less than 60% of an aluminium salt lithium adsorbent.

11. The lithium adsorbent of claim 1, wherein the lithium adsorbent active material is prepared from lithium hydroxide and alumina sol by gelling, aging and heating in the presence of water.

12. The lithium adsorbent of claim 11, wherein a mass ratio of the lithium hydroxide to the alumina sol is (2-10):100; and/or, the heating is performed at a temperature of 80-180° C.; and/or, the heating is performed for 2-24 h.

13. The lithium adsorbent of claim 1, wherein the raw material for preparing the lithium adsorbent further comprises other adjuvants, wherein the other adjuvants are selected from the group consisting of a pore-forming agent, a thickener, and a pH regulator.

14. The lithium adsorbent of claim 13, wherein the pore-forming agent is selected from the group consisting of butylene glycol, glycerol, and sodium chloride; and/or, the thickener is one or a combination of more selected from guar gum, *sesbania* powder, starch, and glucose; and/or, the pH regulator is selected from the group consisting of calcium carbonate, sodium bicarbonate, ammonium chloride, calcium hydroxide, sodium carbonate, and aqueous ammonia; and/or, a mass of the pore-forming agent is 10-100% of the dry weight of the lithium adsorbent active material; and/or, a mass of the thickener is 0.1-2% of the dry weight of the lithium adsorbent active material; and/or, a mass of the pH regulator is 1-20% of the dry weight of the lithium adsorbent active material.

15. The lithium adsorbent of claim 1, wherein the raw material for preparing the lithium adsorbent consists of an aluminum salt lithium adsorbent, silica sol, guar gum and glass fibers, wherein based on a dry weight of the aluminum salt lithium adsorbent being 100%, a mass percentage of a dry matter in the silica sol is 9%, a mass percentage of the guar gum is 1%, and a mass percentage of the glass fibers is 2%; or, the raw material for preparing the lithium adsorbent consists of an aluminum salt lithium adsorbent, silica sol, ammonium chloride, calcium carbonate and glass fibers, wherein based on a dry weight of the aluminum salt lithium adsorbent being 100%, a mass percentage of a dry matter in the silica sol is 9%, a mass percentage of ammonium chloride is 10%, a mass percentage of calcium carbonate is 6%, and a mass percentage of the glass fibers is 3%; or, the raw material for preparing the lithium adsorbent consists of an aluminum salt lithium adsorbent, silica sol, calcium carbonate, sodium bicarbonate and glass fibers, wherein based on a dry weight of the aluminum salt lithium adsorbent being 100%, a mass percentage of a dry matter in the silica sol is 6%, a mass percentage of calcium carbonate is 6%, a mass percentage of sodium bicarbonate is 2%, and a mass percentage of the glass fibers is 4%.

16. A method for preparing the lithium adsorbent of claim 1, comprising the following steps of:

mixing the raw material for preparing the lithium adsorbent, and performing extruding, curing and drying to prepare the lithium adsorbent.

17. The method for preparing the lithium adsorbent of claim 16, wherein the curing is performed at a temperature ranging from room temperature to 80° C.

18. The method for preparing the lithium adsorbent of claim 16, wherein the drying is performed at a temperature ranging from 80° C. to 150° C.

19. The method for preparing the lithium adsorbent of claim 16, wherein the prepared lithium adsorbent is in the form of a strip, and the strip has a width ranging from 0.1 mm to 2 mm and a length ranging from 1 mm to 10 mm.

\* \* \* \* \*